(12) United States Patent
Pang et al.

(10) Patent No.: US 7,427,260 B2
(45) Date of Patent: Sep. 23, 2008

(54) EFFICIENT METHODS FOR SOLID PHASE SYNTHESIS USING TRITYL CHLORIDE RESINS

(75) Inventors: Yuan-Ping Pang, Rochester, MN (US); Jewn Giew Park, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 589 days.

(21) Appl. No.: 10/472,708

(22) PCT Filed: Mar. 29, 2002

(86) PCT No.: PCT/US02/09894

§ 371 (c)(1),
(2), (4) Date: Sep. 23, 2003

(87) PCT Pub. No.: WO02/079278

PCT Pub. Date: Oct. 10, 2002

(65) Prior Publication Data

US 2004/0096904 A1     May 20, 2004

Related U.S. Application Data

(60) Provisional application No. 60/280,210, filed on Mar. 30, 2001.

(51) Int. Cl.
*C40B 50/14* (2006.01)
(52) U.S. Cl. ............................ 506/30; 528/422; 564/305
(58) Field of Classification Search ....................... None
See application file for complete search history.

(56) References Cited

U.S. PATENT DOCUMENTS 5,198,531 A * 3/1993 Webber et al. ............ 525/332.2
5,952,497 A * 9/1999 Carey ........................ 544/183
6,251,583 B1   6/2001 Zhang et al.

OTHER PUBLICATIONS

Matrins et al., "Activation of Multiple Interleukin-1β Converting Enzyme Homologues in Cytosol and Nuclei of HL-60 Cells during Eptoposide-induced Apoptosis" J. Biol. Chem. 1997, 11, 7421-7430.*
Stavropoulos et al. "Preparation of polymer-bound trityl-hydrazines and their application in the solid phase synthesis of partially protected peptide hydrazides" Lett. Pept. Sci. 1994, 2, 315-318.*
Carlson et al., "Solid-Phase Synthesis of Acridine-Based Threading Intercalator Peptides" Bioorg. Med. Chem. Lett. 2000, 10, 1979-1982.*
Green, M. A. "Receptor-Targeted Metalloradiopharmaceuticals", Final Technical Report DE-FG02-97ER62340, 2000, pp. 2-25.*
Bunin, B. A. The Combinatorial Index. New York: Academic Press. 1998, pp. 24, 25, 52, 53, 54, 55, and 129.*
Solomons, T. W. G. Organic Chemistry Fifth Edition. New York: John Wiley and Sons. 1992, p. 242.*
Matrins et al., "Activation of Multiple Interleukin-1β Converting Enzyme Homologues in Cytosol and Nuclei of HL-60 Cells during Eptoposide-induced Apoptosis" J. Biol. Chem. 1997, 11, 7421-7430.*
Stavropoulos et al. "Preparation of polymer-bound trityl-hydrazines and their application in the solid phase synthesis of partially protected peptide hydrazides" Lett. Pept. Sci. 1994, 2, 315-318.*
Carlson et al., "Solid-Phase Synthesis of Acridine-Based Threading Intercalator Peptides" Bioorg. Med. Chem. Lett. 2000, 10, 1979-1982.*
Barlos et al., "Darstellung Geschützter Peptid-Fragmente Unter Einsatz Substituierter Triphenylmethyl-Harze," *Tetrahedron Lett.,* 1989, 30:3943-3946 (English summary included).
Barlos et al., "Application of 4-Polystryryltriphenylmethyl Chloride to the Syntheses of Peptides and Amino Acid Derivatives," *Liebigs Ann. Chem.,* 1988, 1079-1081 (English summary included).
Bunin, *The Combinatorial Index,* Academic Press, San Diego, 1998 (TOC only).
Chen et al., ""Analogous" Organic Synthesis of Small-Compound Libraries: Validation of Combinatorial Chemistry in Small-Molecule Synthesis," *J. Am. Chem. Soc.,* 1994, 116:2661-2662.
Guan et al., "Synthesis of Compound Libraries Based on 3,4-Diaminocylopentanol Scaffolds," *Journal of Combinatorial Chemistry,* 2000, 2(4):297-300.
Leznoff, "The Use of Insoluble Polymer Supports in General Organic Synthesis," *Acc. Chem. Res.,* 1978, 11:327-333.
Nambara et al., "Protein farnesylation in plants: a greasy tale," *Current Opinion in Plant Biology,* 1999, 2:388-392.
Perola et al., "Successful Virtual Screening of a Chemical Database for Farnesyltransferase Inhibitor Leads," *J. Med. Chem.,* 2000, 43:401-408.

* cited by examiner

*Primary Examiner*—Jon D Epperson
(74) *Attorney, Agent, or Firm*—Fish & Richardson P.C.

(57) ABSTRACT

Disclosed are efficient methods for loading amino derivatives onto trityl chloride resins and for cleaving chemically modified amino derivatives from trityl chloride resins. Methods for making a library of discrete chemically modified amino derivatives also disclosed.

5 Claims, 4 Drawing Sheets

A)

B)

Where dimer composition refers to:

Where chain length refers to: $-(CH_2)_n-$, and $n = 2, 4, 5, 7, 9,$ and $11$

US 7,427,260 B2

EFFICIENT METHODS FOR SOLID PHASE SYNTHESIS USING TRITYL CHLORIDE RESINS

CROSS-REFERENCE TO RELATED APPLICATIONS

This application is a National Stage application under 35 U.S.C. §371 that claims the benefit of PCT/US02/09894, filed Mar. 29, 2002, which claims the benefit of U.S. Provisional application Ser. No. 60/280,210, filed Mar. 30, 2001.

BACKGROUND

1. Technical Field

The invention relates to methods for solid phase chemical synthesis. Specifically, the invention provides efficient methods for loading amino derivatives onto trityl chloride resins, and for cleaving modified amino derivatives from a resin. The invention also provides novel chemically modified amino derivatives made by these methods.

2. Background Information

Combinatorial chemistry and automated organic synthesis have been used to generate collections of molecules, or "libraries." As the size of such a library grows, so does the likelihood that it will contain individual molecules having activities suitable for treating human, animal, or plant diseases. Solid-supported methodologies have proven useful to create large chemical libraries.

Trityl chloride resins have been used to immobilize alcohols and amines, typically for solid-supported synthesis of peptides (See e.g., Leznoff, *Acc. Chem. Res.* 1978 11, 327; Chen et al., *J. Am. Chem. Soc.* 1994, 116, 2661; Bunin, *The Combinatorial Index*, Academic Press, San Diego, 1998; Barlos et al., *Liebigs Ann. Chem.* 1988, 1079; Barlos, et al. *Tetrahedron Lett.* 1989 30, 3943). A generalized solid phase synthesis scheme utilizing trityl chloride resins is depicted in FIG. 1. One advantage of using trityl chloride resins over other resins is that trityl chloride resins can be regenerated (e.g., by treating the hydroxytrityl resins that remain after cleaving product from the resin with $SOCl_2$).

SUMMARY

The invention relates to methods that facilitate the use of trityl chloride resins for solid phase chemical synthesis involving amino derivatives. Specifically, the invention provides methods for efficiently loading amino derivatives onto trityl chloride resins. Additionally, the invention provides methods for cleaving chemically modified amino derivatives from trityl chloride resins. Using these novel methods, collections of chemical compounds having potential therapeutic or agrochemical value can be created.

In one aspect, the invention features methods for loading amino derivatives onto trityl chloride resins. The featured methods involve using diisopropylethylamine in methylene chloride to load amino derivatives (e.g., arylamines, amino carboxylic acids, and aminobenzoic acids) onto the trityl chloride resins. In some embodiments the derivative can be an activated 2,5-dioxo-pyrrolidin-1-yl ester, or an activated pentafluorophenyl ester.

In another aspect, the invention features methods for cleaving amino derivatives from a chlorotrityl resin. The featured methods involve using an acetic acid containing solvent to cleave amino derivative from the trityl chloride resin. In some embodiments, the solution is acetic acid, 2,2,2-trifluoroethanol, and methylene chloride (1:2:7).

In another aspect, the invention features methods to produce a library of modified amines. The featured methods involve: 1) using diisopropylethylamine in methylene chloride to load an amino derivative onto a trityl chloride resin; 2) chemically modifying the loaded amino derivative; and 3) cleaving the amino carboxylic acid derivative from the trityl chloride resin using an acetic acid containing solvent. The invention also features collections of chemical compounds obtained by the feature methods.

Unless otherwise defined, all technical and scientific terms used herein have the same meaning as commonly understood by one of ordinary skill in the art to which this invention pertains. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DETAILED DESCRIPTION

Figure 1:
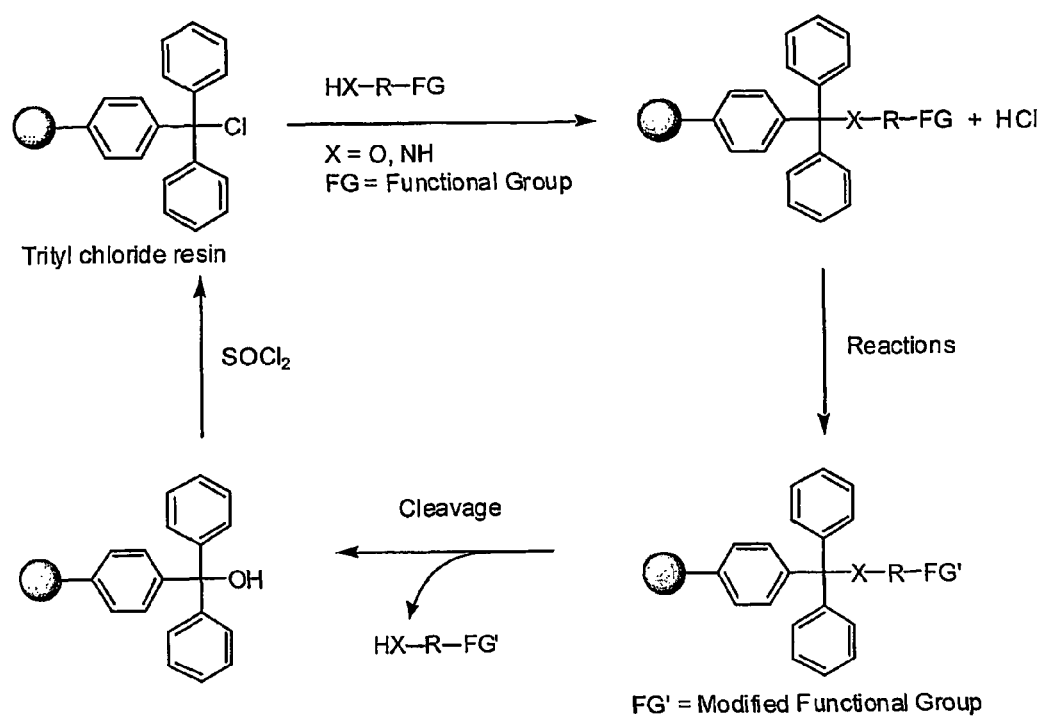
FIG. 1 depicts a generalized scheme for solid phase chemical synthesis using trityl chloride resins.

Several practical problems limit the use of trityl chloride resins for solid phase chemical synthesis involving arylamino derivatives such as aminobenzoic acid derivatives, which can have anti-cancer or herbicidal properties (See e.g., Perola et al., *J. Med. Chem.* 2000, 43, 401-408; Nambara, et al., *Current Opinion in Plant Biology* 1999, 2, 388-392). First, loading arylamino derivatives onto trityl chloride resins using conventional methods generally resulted in a poor yield. Second, other nucleophiles of arylamino derivatives compete with the amino group for reaction with the trityl group. Third, cleavage with 1-5% trifluoroacetic acid as recommended by the resin producer (See, B. A. Bunin, *The Combinatorial Index*, Academic Press, San Diego, 1998) decomposed reaction products, resulting in an inseparable mixture of unknown compounds.

Loading amino Derivatives onto trityl chloride Resins

Any trityl chloride resin is suitable for the present invention, many of which are commercially available (e.g., from Advanced ChemTech (Louisville, Ky., U.S.A.) and Novabiochem (Laufelfingen, Switzerland)). Trityl groups can be deployed on solid substrates such as beads or membranes.

Conventional methods for loading amines traditionally onto chloride resins involves the use of tetrahydrofuran or methylene chloride, without the use of a general base to scavenge the acid generated during the reaction (See, B. A. Bunin, *The Combinatorial Index*, Academic Press, San Diego, 1998). The conventional loading method does not efficiently load arylamines onto trityl chloride resins. In particular, amino carboxylic acid derivatives including amino benzoic acid derivatives do not react well, if at all, with trityl chloride resins in tetrahydrofuran at room temperature. Pyridine and triethylamine, which can be used to scavenge the acid generated during the reaction of a trityl group with alcohols, counterproductively compete with amino carboxylic acid derivatives such as aminobenzoic ester for reaction with the trityl group at room temperature and higher temperatures.

The invention provides methods that use a sterically hindered base to scavenge the acid generated during the reaction of amino carboxylic esters with the trityl group. Tertiary amines at least as sterically hindered as diisopropylethylamine are suitable bases for use in methods according to the invention. The base typically is present in excess relative to the amino carboxylic acid to be loaded (e.g., at a ratio of 10:3 to 10:5 equivalents). Methods according to the invention can load aminobenzoic acid derivatives and other arylamino derivatives (e.g., 4-amino-5-chloro-2-methoxyaniline, 3-nitro-4-chloroaniline, m-toluidine, 1-aminonaphthalene) onto trityl chloride resins in high yields. Methods according to the invention also can be used to load alkylamines onto trityl chloride resins.

In traditional solid phase syntheses, the starting compound that is attached to a resin has at least two functional groups; one functional group to attach to the resin and another for subsequent chemical modification. These two functional groups typically are nucleophilic. A two step method traditionally has been employed to prevent the two nucleophilic groups from competing with each other for reaction with a resin. In the traditional two step method, the nucleophilic functional group intended for chemical modification is protected before reaction with the resin, and is deprotected after loading. The traditional two step process is time and material intensive, and can be disadvantageous for subsequent chemical modification.

Figure 2:
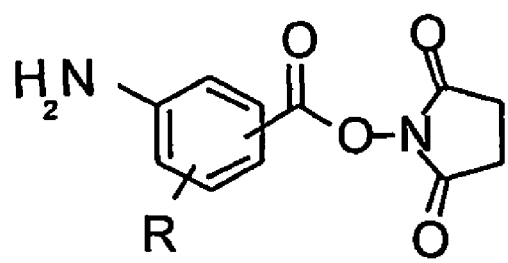
FIG. 2 depicts exemplary activated aminobenzoic acid derivatives, wherein R can be hydrogen, halogen, $O(C_1-C_5)$ alkyl, $(C_1-C_5)$alkyl, acetamido, benzoyl, halogenobenzoyl, aminobenzoyl, carbocyclic aromatic groups, heterocyclic aromatic group, sulfonamide, nitro, acetamido, or combination thereof.
Figure 2:
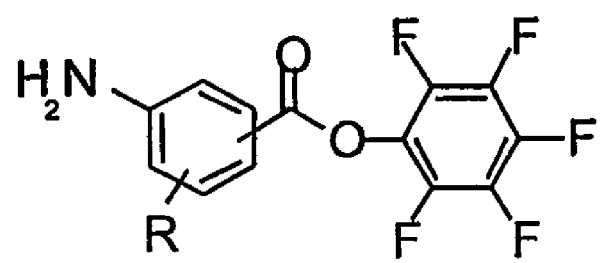

The invention provides methods for selectively attaching the amino group of amino carboxylic acid derivatives to trityl chloride resins by converting carboxylic acid to an activated ester before loading. For example, in solid phase syntheses involving aminobenzoic acid derivatives the amino group can be reacted with the trityl group by converting the benzoic acid group to an activated ester such as 2,5-dioxo-pyrrolidin-1-yl ester or pentafluorophenyl ester (see FIG. 2) that does not react with the trityl group but is suitable for subsequent chemical modification.

Cleaving Modified amino Derivatives from trityl chloride Resins

Conventionally, 1~5% trifluoroacetic acid (TFA) in methylene chloride is used to cleave amines and alcohols from trityl chloride resins (See e.g., B. A. Bunin, *The Combinatorial Index*, Academic Press, San Diego, 1998). Problematically, using TFA in methylene chloride to cleave modified amines from trityl chloride resins yields an inseparable mixture of unknown compounds.

The invention provides mild cleavage methods that use acetic acid-containing solvents. Additional solvents may also be used, the identity and quantity of which depend on the nature of the amino derivative to be cleaved from the resin. For example, a solution of acetic acid, 2,2,2-trifluoroethanol, and methylene chloride (1:2:7) effectively cleaves modified aminobenzoic acid from trityl chloride resins.

Library synthesis

Figure 3:
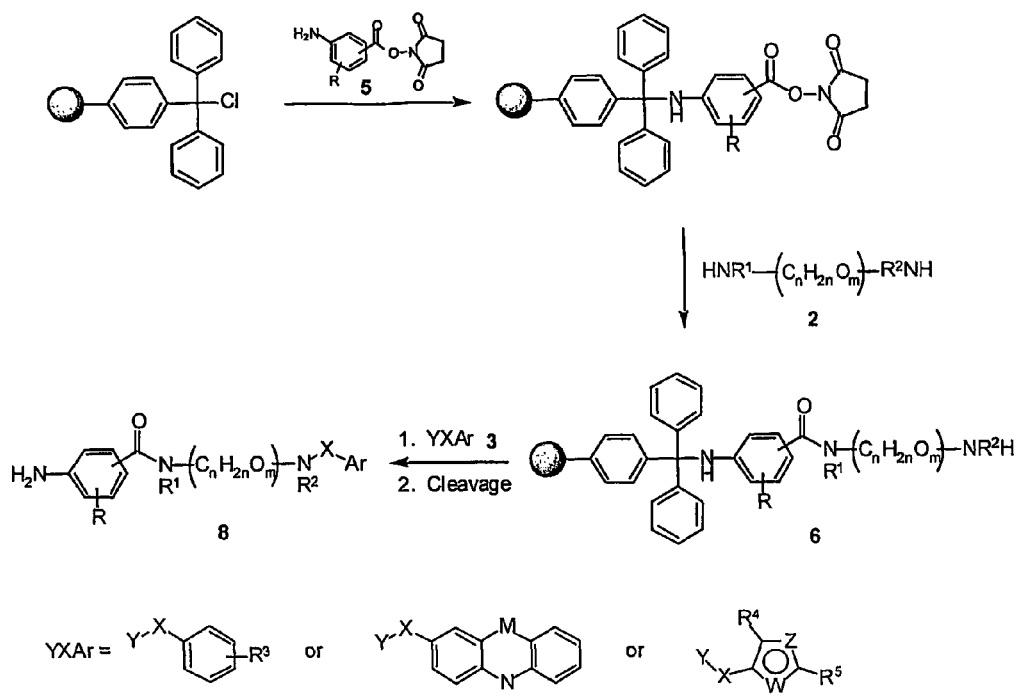
FIG. 3 depicts a scheme for synthesizing a library of discrete amidated aminobenzoic acid derivatives. In the scheme: R, $R^1$, $R^2$, $R^3$, $R^4$, and $R^5$ can be hydrogen, halogen, $O(C_1-C_5)$alkyl, $(C_1-C_5)$alkyl, acetamido, benzoyl, halogenobenzoyl, aminobenzoyl, carbocyclic aromatic group, heterocyclic aromatic group, sulfonamide, nitro, acetamido, or combination thereof; n is an integer between 2 and 14, inclusive; and m is an integer between 0 and 5, inclusive.

The methods described above were used to synthesize a library of 1,925 discrete compounds using trityl chloride resins with aminobenzoic acids (5, FIG. 3), aromatic acids (3, FIG. 3) and a wide range of α, ω-diaminoalkanes as building blocks according to the scheme depicted in FIG. 3. Such building blocks (5 and 3) were identified by computer analysis to be potential inhibitors of farnesyltransferase, and derivatives thereof could be useful as anticancer drugs and/or herbicides. For loading onto resins, the bi-functional aminobenzoic acids were converted to 2,5-dioxopyrrolidin-1-yl esters to give resin-bound active esters (see 5 in FIG. 3; and Examples 1 and 2). Various lengths of unmasked α, ω-diaminoalkane building blocks (see 2 in FIG. 3) were reacted with resin-bound active esters to give amides with an amino group at the end of the molecules (see 6 in FIG. 3; and Example 3, first amidation), which were capped by a second amidation with various aromatic acids (see 3 in FIG. 3; and Example 3, second amidation) to give a library (see 8 in FIG. 3) after cleavage with AcOH:2,2,2-trifluoroethanol (TFE):$CH_2Cl_2$=1:2:7 (see Example 4). At least 80% of the 105 sampled compounds had ≧30% purities in 22-82% yields. The 1,925 member library consists of discrete compounds, the exact structure of which can be determined as a matter of routine by an artisan of ordinary skill in the art.

The invention is further described in the following examples, which do not limit the scope of the invention described in the claims.

EXAMPLES

Example 1

Synthesis of Activated Esters of Aminobenzoic Acids

A) Preparation of 2-(3-Amino-4-chlorobenzoyl)benzoic acid 2,5-dioxopyrrolidin-1-yl ester. To a cooled (0° C.) and stirred solution of 1 g (3.63 mmol) (1 eq) 3-amino-4-chlorobenzoyl-benzoic acid in 30 mL THF was added 0.42 g (3.63 mmol) of N-hydroxysucinimide and 0.75 g (3.63 mmol) of DCC in that order. The resulting mixture was stirred for 30 min at 0° C. and 2 h at room temperature. The white precipitates were filtered off, and the filter cake was washed with EtOAc. The washings and the filtrate were combined and concentrated in vacuo. The residue was further purified by flash chromatography on silica gel. $^1$H NMR (500 MHz, $CDCl_3$) δ 8.24 (d, J=7.8 Hz, 1 H), 7.76 (m, 1 H), 7.65 (m, 1 H), 7.46 (d, J=7.4 H, 1 H), 7.29 (d, J=8.4 Hz, 1 H), 7.21 (d, J=1.9 Hz, 1 H), 7.02 (dd, J=8.4, 1.9 Hz, 1 H), 4.19 (brs, 2 H), 2.79 (s, 4 H); $^{13}$C NMR (125 MHz, DMSO-$d_6$), δ 195.9, 170.9, 161.9, 145.9, 143.6, 136.1, 135.7, 131.2, 131.1, 130.1, 128.9, 123.4, 123.1, 118.2, 116.2, 25.6.

B) 5-Acetylamino-2-aminobenzoic acid 2,5-dioxopyrrolidin-1-yl ester was prepared from 5-acetylamino-2-aminobenzoic acid following the same procedure as the one described in Example 1A. $^1$H NMR (500 MHz, DMSO-$d_6$) δ 9.76 (s, 1 H), 8.17 (d, J=2.4 Hz, 1 H), 7.49 (dd, J=9.1, 2.4 Hz, 1 H), 6.83 (d, J=9.1 Hz, 1 H), 6.61 (s, 2 H), 2.86 (s, 4 H), 1.97 (s, 3 H); $^{13}$C NMR (125 MHz, DMSO-$d_6$), δ 171.7, 168.9, 163.1, 150.3, 130.2, 128.6, 120.2, 118.0, 102.6, 25.6, 23.8.

C) 3-Amino-4-methoxybenzoic acid 2,5-dioxopyrrolidin-1-yl ester was prepared from 3-amino-4-methoxybenzoic acid following the same procedure as the one described in Example 1A. $^1$H NMR (500 MHz, DMSO-d$_6$) δ 7.33 (m, 2 H), 6.99 (d, J=8.9 Hz, 1 H), 5.19 (brs, 2 H), 3.87 (s, 3 H), 2.85 (s, 4 H); $^{13}$C NMR (125 MHz, DMSO-d$_6$), δ 171.6, 162.8, 152.6, 139.2, 120.2, 117.1, 114.2, 110.9, 56.0, 25.6.

D) 4-Amino-5-chloro-2-methoxybenzoic acid 2,5-dioxopyrrolidin-1-yl ester was prepared from 4-amino-5-chloro-2-methoxybenzoic acid following the same procedure as the one described in Example 1A. $^1$H NMR (600 MHz, DMSO-d$_6$) δ 7.72 (s, 1 H), 6.66 (brs, 2 H), 6.49 (s, 1 H), 3.77 (s, 3 H), 2.82 (s, 4 H); $^{13}$C NMR (150 MHz, DMSO-d$_6$), δ 171.8, 162.1, 159.6, 153.0, 133.5, 109.1, 100.6, 97.8, 56.1, 25.6.

E) 4-Amino-3-iodobenzoic acid 2,5-dioxolpyrrolidin-1-yl ester was prepared from 4-amino-3-iodobenzoic acid following the same procedure as the one described in Example 1A. $^1$H NMR (600 MHz, DMSO-d$_6$) δ 8.19 (s, 1 H), 7.76 (d, J=8.5 Hz, 1 H), 6.81 (d, J=8.5 Hz, 1 H), 6.53 (brs, 2 H), 2.85 (s, 4 H); $^{13}$C NMR (150 MHz, DMSO-d$_6$), δ 171.6, 161.2, 155.8, 153.0, 142.1, 132.3, 113.8, 112.5, 81.5, 25.6.

F) 4-Amino-3-methoxybenzoic acid 2,5-dioxopyrrolidin-1-yl ester was prepared from 4-amino-3-methoxybenzoic acid following the same procedure as the one described in Example 1A. $^1$H NMR (500 MHz, DMSO-d$_6$) δ 7.52 (d, J=8.4, 1.5 Hz, 1 H), 7.30 (s, 1 H), 6.72 (d, J=8.4 Hz, 1 H), 6.15 (brs, 2 H), 3.83 (s, 3 H), 2.84 (s, 4 H); $^{13}$C NMR (125 MHz, DMSO-d$_6$), δ 171.9, 162.6, 146.4, 146.1, 126.5, 112.8, 111.5, 110.0, 55.8, 25.7.

G) 2-Amino-6-methylbenzoic acid 2,5-dioxopyrrolidin-1-yl ester was prepared from 2-amino-6-methylbenzoic acid following the same procedure as the one described in Example 1A. $^1$H NMR (500 MHz, DMSO-d$_6$) δ 7.15 (t, J=7.2 Hz, 1 H), 6.56 (d, J=7.6 Hz, 1 H), 6.54 (d, J=8.4 Hz, 1 H), 2.80 (m, 4 H), 2.51 (s, 3 H); $^{13}$C NMR (125 MHz, DMSO-d$_6$), δ 170.4, 165.0, 150.5, 141.6, 134.4, 120.8, 114.9, 109.6, 25.8, 22.4.

Example 2

Loading Aminobenzoic Acid Derivatives onto Trityl Chloride Resins

Porous polypropylene containers, MicroKan (IRORI, San Diego, Calif.), were packed with 20 mg of trityl chloride resins and a unique radiofrequency tag (IRORI, San Diego, Calif.). MicroKans were then soaked with 2 mL/MicroKan of CH$_2$Cl$_2$ in a 50 mL bottle for 10 min. 10 eq of diisopropylethylamine and 3-5 eq of an activated ester were then added to the bottle which was then shaken for 17 h on an orbit shaker (VWR Scientific Products, Chicago, Ill.) at 120 rpm at room temperature. After the solvent and the excess reagents were removed by suction, all MicroKans were combined and washed sequentially with 2 mL MeOH/MicroKan and with 2 mL CH$_2$Cl$_2$/MicroKan. Each washing required 10 min shaking of the resins with the solvent. The sequential washing process was repeated three times. The washed resins in MicroKans were dried in vacuo.

Example 3

Modification of Loaded Aminobenzoic Acid Derivatives

A First Amidation

Combined MicroKans containing dried resins described above were separated by a radiofrequency reader (IRORI, San Diego, Calif.). After soaking the resins with 2 mL/MicroKan of anhydrous THF in a 50 mL bottle for 10 min, 10 eq of an appropriate diamine (e.g., 2,2'-(ethylenedioxy)bis(ethylamine); 4,7,10-trioxa-1,13-tridecanediamine; 1,7-diaminoheptane; 1,11-diaminodecane; 1,9-diaminononane; ethylene diamine; 3-(2-Amino-ethoxy)-propylamine; 3-[2-(2-Amino-ethoxy)-ethoxy]-propylamine; 4-Aminomethyl-benzylamine; Hex-3-ene-1,6-diamine) was added to THF and the bottle containing the MicroKan and solvent were shaken on an orbit shaker at 120 rpm at room temperature for 17 h. The resins were washed and dried in the same manner as described above.

A Second Amidation

Method A. The same procedure as the one used for the first amidation except that 5 eq of DCC, 5 eq of HOBt, and 3 eq of an appropriate benzoic acid (e.g., 9,10,10-Trioxo-9,10-dihydro-10λ$^6$-thioxanthene-3-carboxylic acid; 2-(4-chloro-3-nitrobenzoyl)benzoic acid; 4-acetylbenzoic acid; 3-benzoylbenzoic acid) were added to THF.

Method B. The same procedure as the one used for the first amidation except that 2 mL/MicroKan of anhydrous CH$_2$Cl$_2$ was used for soaking the resins and 10 eq of diisopropylethylamine, and 3 eq of an appropriate substituted benzoyl or sulfonyl chloride (e.g., 2,4-dichloro-5-sulfamoylzenzoic acid; 2-(4-Chloro-3-nitro-benzoyl)-benzoic acid; 9,10,10-Trioxo-9,10-dihydro-1016-thioxanthene-3-carboxylic acid; 4-Nitro-benzoyl chloride) were added to the reaction bottle, and the bottle was shaken for 6 h.

Example 4

Cleaving Products from the Resins

Combined MicroKans containing dried resins from Methods A and B were separated by the radiofrequency reader and placed individually in labeled vials. After each MicroKan was soaked with 4 mL of a solution of AcOH/TFE/CH$_2$Cl$_2$ (1:2:7) at room temperature for 2 h, the cleavage solution was collected via suction. The MicroKan was soaked again with 2 mL of a solution of AcOH/TFE/CH$_2$Cl$_2$ (1:2:7) at room temperature for 1 h. The combined cleavage solutions were concentrated to yield the desired product. Products obtained include:

A) N-[2-(4-Acetylaminobenzenesulfonylamino)ethyl]-2-(3-amino-4-chlorobenzoyl)benz-amide. $^1$H NMR (500 MHz, CD$_3$OD) δ 7.73 (d, J=7.3 Hz, 1 H), 7.68 (ABq, J=8.7 Hz, 4 H), 7.55 (dt, J=7.3, 0.8 Hz, 1 H), 7.49 (t, J=7.3 Hz, 1 H), 7.26 (d, J=7.3 Hz, 1 H), 7.09 (d, J=8.3 Hz, 1 H), 6.82 (d, J=1.6 Hz, 1 H), 6.49 (dd, J=8.3, 1.6 Hz, 1 H), 3.52 (m, 1 H), 3.06 (m, 1 H), 2.82 (m, 2 H), 2.15 (s, 3 H).

B) N-[2-(4-Acetylaminobenzenesulfonylamino)ethyl]-4-amino-5-chloro-2-methoxybenz-amide. $^1$H NMR (500 MHz, CD$_3$OD) δ 7.75 (s, 1 H), 7.69 (ABq, J=8.8 Hz, 4 H), 6.46 (s, 1 H), 3.91 (s, 3 H), 3.41 (t, J=5.9 Hz, 2 H), 3.09 (t, J=5.9 Hz, 2 H), 2.14 (s, 3 H).

C) N-[2-(4-Acetylaminobenzenesulfonylamino)-ethyl]-4-amino-3-methoxybenzamide. $^1$H NMR (500 MHz, CD$_3$OD) δ 7.71 (ABq, J=8.8 Hz, 4 H), 7.26 (d, J=1.6 Hz, 1 H), 7.22 (dd, J=8.0, 1.6 Hz, 1 H), 6.67 (d, J=8.0 Hz, 1 H), 3.87 (s, 3 H), 3.39 (t, J=6.0 Hz, 2 H), 3.07 (t, J=6.0 Hz, 2 H), 2.13 (s, 3 H).

D) N-[2-(4-Acetylaminobenzenesulfonylamino)ethyl]-3-amino-4-methoxybenzamide. $^1$H NMR (500 MHz, CD$_3$OD) δ 7.72 (ABq, J=8.3 Hz, 4 H), 7.13-7.10 (m, 2 H), 6.84 (d, J=8.3 Hz, 1 H), 3.88 (s, 3 H), 3.39 (t, J=5.8 Hz, 2 H), 3.06 (t, J=5.8 Hz, 2 H), 2.13 (s, 3 H).

E) N-[2-(4-Acetylaminobenzenesulfonylamino)ethyl]-4-amino-3-iodobenzamide $^1$H NMR (500 MHz, CD$_3$OD) δ

8.03 (d, J=1.7 Hz, 1 H), 7.71 (ABq, J=8.8 Hz, 4 H), 7.52 (dd, J=8.5, 1.7 Hz, 1 H), 6.73 (d, J=8.5 Hz, 1 H), 3.37 (t, J=5.9 Hz, 2 H), 3.06 (t, J=5.9 Hz, 2 H), 2.14 (s, 3 H).

F) 9,10,10-Trioxo-9,10-dihydro-10$\lambda^6$-thioxanthene-3-carboxylic acid {4-[2-(3-amino-4-chlorobenzoyl) benzoylamino]butyl}amide. $^1$H NMR (500 MHz, CD$_3$OD) δ 8.57 (s, 1 H), 8.40 (dd, J=8.1, 2.4 Hz, 1 H), 8.35 (d, J=7.8 Hz, 1 H), 8.23 (m, 1 H), 8.20 (d, J=7.8 Hz, 1 H), 8.02 (t, J=7.4 Hz, 1 H), 7.91 (t, J=7.8 Hz, 1 H), 7.76 (d, J=7.4 Hz, 1 H), 7.55 (t, J=7.4 Hz, 1 H), 7.49 (t, J=7.4 Hz, 1 H), 7.28 (d, J=7.4 Hz, 1 H), 7.11 (d, J=8.4 Hz, 1 H), 6.89 (d, J=1.7 Hz, 1 H), 6.61 (dd, J=8.4, 1.7 Hz, 1 H), 3.54 (m, 1 H), 3.32 (m, 2 H), 3.19 (m, 1 H), 1.64 (m, 4 H).

G) 9,10,10-Trioxo-9,10-dihydro-10$\lambda^6$-thioxanthene-3-carboxylic acid {2-[2-(3-amino-4-chlorobenzoyl)benzoylamino]ethyl}amide. $^1$H NMR (500 MHz, CDCl$_3$) δ 8.40 (s, 1 H), 8.32 (d, J=7.8 Hz, 1 H), 8.29 (d, J=8.1 Hz, 1 H), 8.18 (d, J=7.7 Hz, 1 H), 7.99 (d, J=8.1 Hz, 1 H), 7.90 (t, J=7.6 Hz, 1 H), 7.81 (t, J=7.6 Hz, 1 H), 7.75 (brs, 1 H), 7.71 (d, J=7.1 Hz, 1 H), 7.48 (t, J=7.3 Hz, 1 H), 7.44 (t, J=7.3 Hz, 1 H), 7.31 (d, J=7.3 Hz, 1 H), 7.19 (d, J=8.4 Hz, 1 H), 6.95 (s, 1 H), 6.67 (d, J=8.1 Hz, 1 H), 5.50 (brs, 1 H), 4.20 (m, 1 H), 4.15 (brs, 2 H), 4.04 (m, 1 H), 3.35 (d, J=11.4 Hz, 1 H), 3.16 (d, J=14.5 Hz, 1 H).

H) 9,10,10-Trioxo-9,10-dihydro-10$\lambda^6$-thioxanthene-3-carboxylic acid [4-(5-acetylamino-2-aminobenzoylamino)butyl]amide. $^1$H NMR (500 MHz, CD$_3$OD) δ 8.59 (s, 1 H), 8.40 (d, J=8.0 Hz, 1 H), 8.35 (d, J=7.7 Hz, 1 H), 8.28 (d, J=8.0 Hz, 1 H), 8.20 (d, J=7.6 Hz, 1 H), 7.99 (t, J=7.6 Hz, 1 H), 7.91 (t, J=7.7 Hz, 1 H), 7.57 (s, 1 H), 7.16 (d, J=8.2 Hz, 1 H), 6.70 (d, J=8.2 Hz, 1 H), 3.49 (t, J=6.3 Hz, 2 H), 3.39 (t, J=6.3 Hz, 2 H), 2.08 (s, 3 H), 1.73 (m, 4 H).

I) N-[4-(2-(3-Nitro-4-chlorobenzoyl)benzamido)butyl]-2-(3-amino-4chlorobenzoyl)-benzamide. $^1$H NMR (500 MHz, CD$_3$OD) δ 8.63 (d, J=8.7 Hz, 2 H), 7.99 (d, J=8.7 Hz, 2 H), 7.57 (d, J=1.8 Hz, 1 H), 7.15 (dd, J=7.7, 1.8 Hz, 1 H), 6.71 (d, J=7.7 Hz, 1 H), 3.40 (t, J=6.9 Hz, 2 H), 3.33 (t, J=6.9 Hz, 2 H), 2.08 (s, 3 H), 1.63 (m, 4 H), 1.43 (m, 6 H).

J) N-[4-(4-Nitrobenzamido)butyl]-2-(3-amino-4-chlorobenzoyl)benzamide. $^1$H NMR (500 MHz, CDCl$_3$) δ 8.49 (d, J=8.5 Hz, 2 H), 7.94 (d, J=8.5 Hz, 2 H), 7.73 (d, J=7.2 Hz, 1 H), 7.48 (t, J=7.2 Hz, 1 H), 7.44 (t, J=7.1 Hz, 1 H), 7.29 (d, J=7.3, 1 H), 7.17 (d, J=8.0 Hz, 1 H), 7.04 (brs, 1 H), 6.84 (s, 1 H), 6.67 (d, J=8.0 Hz, 1 H), 4.09 (brs, 2 H), 3.55 (m, 1 H), 3.49 (m, 1 H), 3.39 (m, 1 H), 3.08 (m, 14 H), 1.68 (m, 4 H).

K) N-[2-(4-Nitrobenzamido)ethyl]-2-(3-amino-4-chlorobenzoyl)benzamide. $^1$H NMR (500 MHz, CD$_3$OD) δ 8.29 (d, J=8.6 Hz, 2 H), 7.96 (d, J=8.6 Hz, 2 H), 7.76 (d, J=7.5 Hz, 1 H), 7.58 (t, J=7.3 Hz, 1 H), 7.51 (t, J=7.3, 1 H), 7.31 (d, J=7.5 Hz, 1 H), 7.11 (d, J=8.3 Hz, 1 H), 6.92 (d, J=1.8 Hz, 1 H), 6.62 (dd, J=8.3, 2.0 Hz, 1 H), 3.85 (m, 1 H), 3.70 (m, 1 H), 3.54 (m, 1 H), 3.32 (m, 1 H).

L) N-[7-(4-Nitrobenzamido)heptyl]-2-(3-amino-4-chlorobenzoyl)benzamide. $^1$H NMR (500 MHz, CDCl$_3$) δ 8.24 (d, J=8.4 Hz, 2 H), 7.84 (d, J=8.4 Hz, 2 H), 7.73 (d, J=7.2 Hz, 1 H), 7.47 (m, 2 H), 7.28 (d, J=7.3, 1 H), 7.18 (d, J=8.3 Hz, 1 H), 6.83 (s, 1 H), 6.66 (d, J=8.3 Hz, 1 H), 6.49 (brs, 1 H), 3.49 (m, 2 H), 3.38 (m, 1 H), 2.95 (m, 1 H), 1.59-1.22 (m, 10 H).

Example 5

Properties of Library Compounds

The inhibition of farnesyltransferase (FT) by 54 compounds randomly selected from a library made according to Examples 1-4 were measured by using an FT [$^3$H]-SPA kit (Amersham Biosciences, Piscataway, N.J., U.S.A). In this assay, recombinant rat FT was incubated at a final concentration of 0.6 to 1.2 ng/μL for 1 h in the presence of [$^3$H] farnesyl pyrophsospaate (FPP), a human lamin-B carboxy-terminal sequence peptide (biotin-YRASNRSCAIM), and a library compound. Library compounds were dissolved in DMSO and diluted 1:10 in the final assay solution, to a final concentration of 100 μM. Control reactions contained 10% DMSO instead of a library compound. In an assay, the sequence peptide is [$^3$H] farnesylated at the cysteine near the C-terminus when processed by FT, and the resultant [$^3$H] farnesyl-(CYS)-biotin lamin B is captured by a streptavidin-linked SPA bead. Radioactivity attributable to the sequence peptide was measured using a Beckman LS 6000IC scintillation counter.

Figure 4:
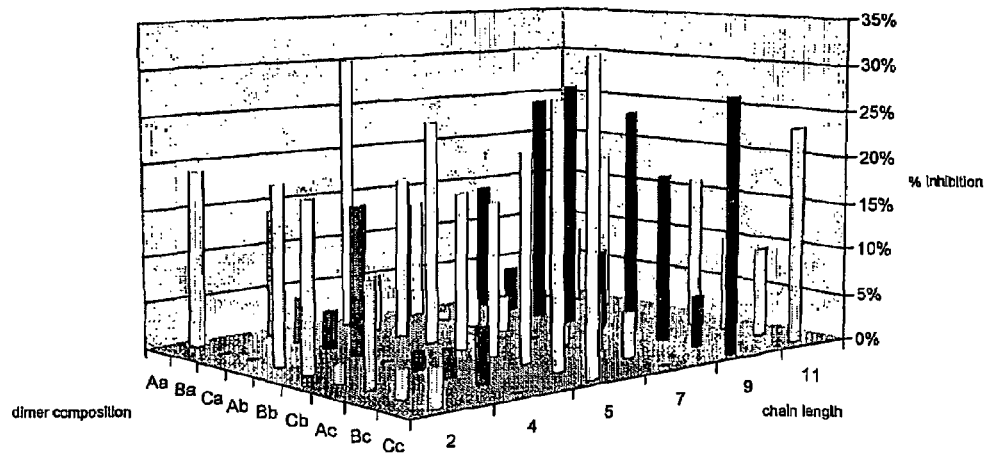
FIG. 4 is a chart illustrating Farnesyltransferase inhibition activities of randomly selected compounds from a library.
Figure 4:
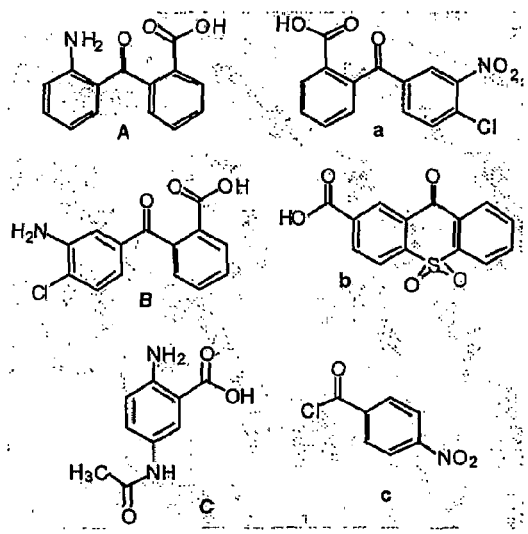

Most of the 54 library compounds inhibited FIT (see FIG. 4). FTT inhibition is a measure of the radioactivity attributed to the sequence polypeptide in an assay containing a library compound (i.e., test signal) relative to the radioactivity attributed to a sequence polypeptide in a control assay (i.e., control signal). That is, % inhibition=(control signal−test signal)/control signal×100%. Each assay was carried out in duplicate with deviations less than 10%. Thus, members of the library are effective FTT inhibitors and could be used as anticancer drugs and/or herbicides to block undesirable cell proliferation.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for loading acid-containing arylamines onto trityl chloride resins, wherein said method comprises:
   (a) obtaining activated-ester-containing arylamines comprising an acid moiety that is protected from reacting with a trityl group and activated for subsequent modification, wherein said activated-ester-containing arylamines comprise an unblocked amino group, and
   (b) using diisopropylethylamine in methylene chloride to load said activated ester-containing arylamines onto said trityl chloride resins through an amino group of said activated ester-containing arylamines.

2. The method of claim 1, wherein said acid-containing arylamine is an aminobenzoie acid derivative.

3. The method of claim 2, wherein the derivative is an activated 2,5-dioxo-pyrrolidin-1-yl ester.

4. The method of claim 2, wherein the derivative is an activated pentafluorophenyl ester.

5. A method to produce a library of modified acid-containing arylamines, comprising:
   a) using diisopropylethylamine in methylene chloride to load an activated-ester-containing arylamine onto a trityl chloride resin through an amino group of said activated-ester-containing arylamine, wherein an acid moiety of said activated-ester-containing arylamine is blocked and activated using N-hydroxysuccinimide or pentafluorophenyl ester, and wherein said activated-ester-containing arylamine comprises an unblocked amino group;
   b) chemically modifying said loaded acid-containing arylamine; and
   c) cleaving said chemically modified acid-containing arylamine from said trityl chloride resin using an acetic acid containing solution.

* * * * *

UNITED STATES PATENT AND TRADEMARK OFFICE
CERTIFICATE OF CORRECTION

PATENT NO. : 7,427,260 B2  
APPLICATION NO. : 10/472708  
DATED : September 23, 2008  
INVENTOR(S) : Yuan-Ping Pang It is certified that error appears in the above-identified patent and that said Letters Patent is hereby corrected as shown below:

Title Page, (56) References Cited, Other Publications, Stavropoulos et al. reference, please delete "Synthesisof" and insert --Synthesis of-- therefor;

Title Page, (56) References Cited, Other Publications, please delete second Matrins et al. reference as it is a duplicate;

Title Page, (56) References Cited, Other Publications, please delete second Stavropoulous et al. reference as it is a duplicate;

Title Page, (56) References Cited, Other Publications, please delete second Carlson et al. reference as it is a duplicate;

Title Page, (56) References Cited, Other Publications, second Barlos et al. reference, please delete "Polystryryltriphenylmethyl" and insert --Polystyryltriphenylmethyl-- therefor;

Title Page, (56) References Cited, Other Publications, Guan et al. reference, please delete "Diaminocylopentanol" and insert --Diaminocyclopentanol-- therefor;

Column 8, line 43 (Claim 2), please delete "aminobenzoie" and insert --aminobenzoic-- therefor.

Signed and Sealed this

Thirtieth Day of June, 2009

JOHN DOLL  
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,427,260 B2 | Page 1 of 1 |
| APPLICATION NO. | : 10/472708 | |
| DATED | : September 23, 2008 | |
| INVENTOR(S) | : Pang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 998 days.

Signed and Sealed this

Fifteenth Day of February, 2011

David J. Kappos
*Director of the United States Patent and Trademark Office*